US00RE37171E

(19) United States
(12) Reissued Patent
Busche et al.

(10) Patent Number: US RE37,171 E
(45) Date of Reissued Patent: May 8, 2001

(54) EASY OPEN PACKAGE

(75) Inventors: David A. Busche, Neenah; David H. Bostian, Sheboygan, both of WI (US)

(73) Assignee: Curwood, Inc., Oshkosh, WI (US)

(21) Appl. No.: 08/091,590

(22) Filed: Jul. 14, 1993

Related U.S. Patent Documents

Reissue of:
(64) Patent No.: 4,944,409
Issued: Jul. 31, 1990
Appl. No.: 07/309,321
Filed: Feb. 10, 1988

(51) Int. Cl.[7] ..... B65D 65/26

(52) U.S. Cl. ..... 383/210; 206/484; 206/813; 428/516

(58) Field of Search ..... 383/210, 211; 428/40, 349, 516, 517; 206/484, 813

(56) References Cited

U.S. PATENT DOCUMENTS

| | | |
|---|---|---|
| 3,552,638 | 1/1971 | Quackenbush . |
| 3,655,503 | 4/1972 | Stanley et al. . |
| 3,817,821 | 6/1974 | Gallini . |
| 4,058,632 | 11/1977 | Evans et al. . |
| 4,189,519 | 2/1980 | Ticknor . |
| 4,252,846 | 2/1981 | Romesberg et al. . |
| 4,405,667 | 9/1983 | Christensen et al. . |
| 4,521,467 | 6/1985 | Berger . |
| 4,589,568 | 5/1986 | Ito et al. . |
| 4,615,926 | 10/1986 | Hsu et al. . |
| 4,638,913 | 1/1987 | Howe, Jr. . |
| 4,666,778 | 5/1987 | Hwo . |

(List continued on next page.)

FOREIGN PATENT DOCUMENTS

0239319 A2 9/1987 (EP) .

OTHER PUBLICATIONS

Article titled "Polymer Combination for Peel/Seal Applications", Alister M. Soutar, TAPPI Seminar Notes, 1986 Coextrusion, pp. 31–43.
Article titled "Polybutylene Blends as Easy Open Seal Costs for Flexible Packaging and Lidding", Charles C. Hwo, Journal of Plastic Film & Sheeting, vol. 3—Octoer 1987, pp. 245–260.
Paper titled "Easy Open Seals for Flexible Packaging and Lidding", Charles C. Hwo, presented at FUTURE–PAK '86 Fourth International Ryder Conference on Packaging Innovations on Dec. 3–5, 1986.
Preliminary Technical Bulletin SC–912–86 of Shell Chemical Company titled "Shell DURAFLEX Polybutylene—Development Product DP1560".
Technical Bulletin SC:267–79 of Shell Chemical Company titled "Shell Polybutylene 1600 series—Film grade Resins"—Oct. 1979.
Article titled "Developed specifically for improved hot melt performance"—1987.

(List continued on next page.)

*Primary Examiner*—Jes F. Pascua
(74) *Attorney, Agent, or Firm*—Lee, Mann, Smith, McWilliams, Sweeney & Ohlson

(57) ABSTRACT

An easy open package adapted to be heat sealed closed and peelably reopened including a first package wall comprising an outer layer, an inner sealant layer and a tie layer disposed between and peelably bonded to either the inner layer or the outer layer and a second package wall joined about a portion of its perimeter to the first package wall and comprising at least one layer, that layer being a sealant layer having the same composition as the inner sealant layer of the first package wall and disposed adjacent thereto, the sealant layers being heat sealable together to form a bond having a bond strength greater than the bond between the tie layer and the layer to which it is peelably bonded, that bond strength being predetermined by the selection of the compositions of the adjacent layers.

14 Claims, 1 Drawing Sheet

U.S. PATENT DOCUMENTS

| | | |
|---|---|---|
| 4,673,601 | 6/1987 | Lamping et al. . |
| 4,759,984 | 7/1988 | Hwo . |
| 4,784,885 | 11/1988 | Carespodi . |
| 4,808,662 | 2/1989 | Hwo . |
| 4,869,963 | 9/1989 | Galelucci et al. . |
| 4,870,134 | 9/1989 | Hwo . |
| 4,875,587 | 10/1989 | Lulham et al. . |
| 4,876,156 | 10/1989 | Hwo . |
| 4,882,229 | 11/1989 | Hwo . |

OTHER PUBLICATIONS

Deposition of Gregory A. Hayes, including Hayes Exhibit 2, taken Jun. 30, 1993, in Curwood v. American National Can, U.S.D.C.N.D. Ill. No. 93 C 1133.

Deposition of Connie Alford, including Alford Exhibits 1 and 4–11 and Plaintiff's Exhibits 1–6, taken Jun. 30, 1993 in Curwood v. American National Can, U.S.D.C.N.D. Ill. 93 C 1133.

EASY OPEN PACKAGE

Matter enclosed in heavy brackets [ ] appears in the original patent but forms no part of this reissue specification; matter printed in italics indicates the additions made by reissue.

BACKGROUND OF THE INVENTION

The present invention relates to hermetically heat sealable packages which contain a product therein, but which may be readily opened by application of force. Prior art patents teach easy open packages wherein the heat seal is formed by controlling the conditions of forming the seal between two identical seal surfaces, by sealing dissimilar surfaces or by contaminating one or both sealant layers with normally incompatible thermoplastic materials. Examples of these types of packages are disclosed in U.S. Pat. No. 4,782,951 and European patent application No. 0 239 319. These seals do not provide consistent failure mechanism when the package is peeled open.

SUMMARY OF THE INVENTION

The present invention provides an easy open package adapted to be heat sealed to a closed condition to contain and protect a product disposed therein. The package is readily openable by application of force. The package includes a first package wall joined at a portion of its periphery to a second package wall. The first wall comprises a thermoplastic polymeric film construction having an outer layer, an inner sealant layer of polymer and a tie layer disposed between the inner and outer layers. The tie layer is peelably bonded to either the outer layer or the inner layer and permanently bonded to the other layer. The second wall defines a thermoplastic polymeric film construction comprising at least one layer, that layer being a sealant layer of the same polymer as the inner sealant layer of the first wall and disposed adjacent thereto. In another embodiment, an outer layer is provided in the second package wall. In still another embodiment, a tie layer is included in the second package wall, the tie layer disposed between the sealant and outer layers. In all embodiments, when the first wall sealant layer and the second wall sealant layer are heat sealed together, a bond is formed having a greater bond strength than the peelable bond between the tie layer and the layer to which it is peelably bonded. The peel will occur between the two layers having the lower bond strength. This is predetermined by the selection of the compositions of the adjacent layers.

DETAILED DESCRIPTION OF THE INVENTION

Figure 1:
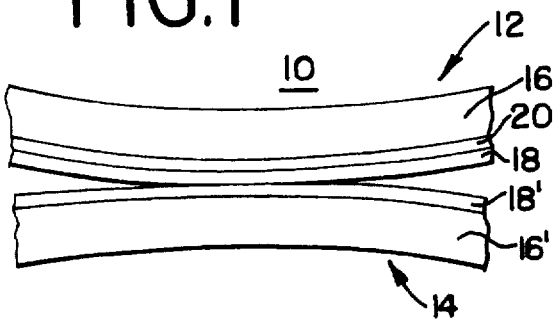
FIG. 1 shows a side view of a preferred embodiment of the seal portion of the package of the present invention.
Figure 2:
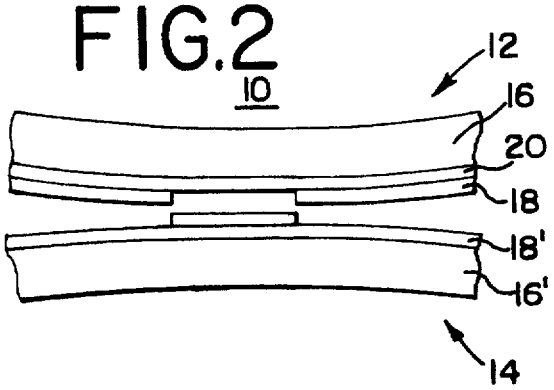
FIG. 2 shows one predetermined mode of peel failure of the seal shown in FIG. 1.
Figure 3:
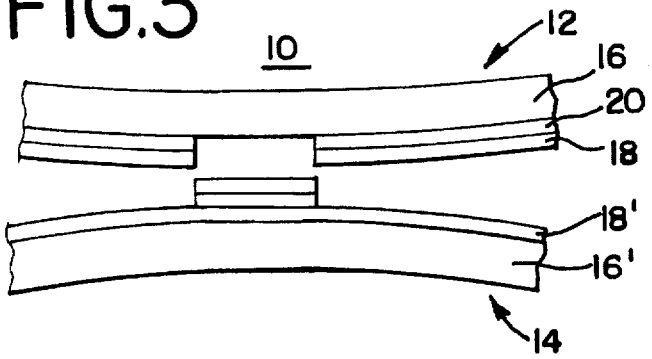
FIG. 3 shows an alternate predetermined mode of peel failure of the seal shown in FIG. 1.

The preferred embodiment of an easy open package 10 is shown in FIGS. 1–3 of the drawings. The package 10 is comprised of two sheets of web joined at a portion of their perimeters (not shown) and includes a first package wall, generally designated by the numeral 12, and a second package wall, generally designated by the numeral 14. The two package walls 12 and 14 may be joined about three edge to form a package with an opening through which product may be inserted. The first wall 12 of the preferred embodiment comprises a thermoplastic polymeric film construction of a three layer coextrusion comprising a first outer layer 16, a first inner sealant layer 18 of polymer and a first tie layer 20 disposed between the first outer layer 16 and the first inner layer 18. The first tie layer 20 is peelably bonded to either the first outer layer 16 or the first inner layer 18 and permanently bonded to the other layer. The "peelable" bonding and the "permanent" bonding is effected during the coextrusion process during which the first package wall 12 is formed. Those two materials having a greater affinity for each other establish a relatively permanent bond between the layers, whereas those two materials having a lesser affinity for each other establish a relatively peelable bond between the layers. Selection of the various materials determines the nature of the bond.

The second package wall 14 of the preferred embodiment comprises a thermoplastic polymeric film construction of a two layer coextrusion comprising a second outer layer 16' and a second inner sealant layer 18' disposed adjacent the first sealant layer 18 of the first wall 12.

The outer layers 16, 16' may be composed of substantially 100% of a first constituent selected from the group consisting of ethylene vinyl acetate copolymer, linear low density polyethylene, low density polyethylene, neutralized ethylene acid copolymer or other suitable extrudable polyolefin polymers or copolymers, as ethylene acrylate copolymer or ethylene methyl acrylate copolymer, or they may be composed of at least 50% of one of the first constituents and a correlative percentage of another of the first constituents. The outer layers 16, 16' generally have a thickness of between 0.5 mils and 4.0 mils or more. The outer surfaces of the outer layers 16, 16' may be emulsion coated with polyvinylidene chloride and then extrusion coated with Nylon 6 and/or provided with additional functional layers, such as paper, metal or other thermoplastic layers to provide the package 10 with such functional characteristics as strength, rigidity, abrasion resistance, gas and water vapor barriers, aesthetics and optical properties, flex crack resistance and other properties needed to contain, preserve and protect the contents of the package 10.

The first and second inner sealant layers 18 and 18' are composed of the same material and are selected from a group of materials all of which are known to seal well to themselves. Such materials include low density polyethylene, linear low density polyethylene, ethylene vinyl acetate copolymer, neutralized ethylene acid copolymer sold under the registered trademark SURLYN by E. I. du Pont De Nemours, or unneutralized ethylene acid copolymers. Generally these layers have a thickness of between 0.1 mils and 0.5 mils, preferably 0.2 mils thick.

The tie layer 20 is selected to have a relatively low peel strength when peelably bonded to either the first outer layer 16 or the first inner sealant layer 18, as previously described. The thickness of the tie layer 20 should be between 0.1 and 0.5 mils thick with 0.2 mils optimum for most applications. It is generally comprised of a combination of polybutylene and either ethylene vinyl acetate copolymer, linear low density polyethylene, neutralized ethylene acid copolymer or unneutralized ethylene acid copolymer. The specific blends of the above polymers, which will be discussed below, produce a tie layer 20 having optical clarity.

Careful selection of a tie layer 20 and its relative affinity for adjacent layers predetermines between which two adjacent layers, either the first outer layer 16 and the tie layer 20 or the first inner sealant layer 18 and the tie layer 20, the peel will occur, thereby providing a consistent failure mechanism. In other words, because of the compositions of the respective first layers 16, 18 and 20, when the first and second inner sealant layers 18 and 18' are heat sealed together, a bond is formed therebetween having a bond strength greater than the bond between either the first outer layer 16 and the first tie layer 20 or the first tie layer 20 and the first inner sealant layer 18.

Specific examples of first and second package walls 12 and 14 and their respective layers will now be discussed. The outer layers 16 and 16' may be comprised of 50% ethylene vinyl acetate copolymer (EVA) and 50% linear low density polyethylene (LLDPE). The inner sealant layers 18 and 18' may be composed of 100% neutralized ethylene acid copolymer and the tie layer 20 composed of 88% EVA and 12% polybutylene (PB). Alternatively, the outer layers 16 and 16' may be composed of 100% LLDPE the inner sealant layers 18 and 18' of 100% neutralized ethylene acid copolymer and the tie layer 20 of 88% LLDPE and 12% PB. The first and second package walls 12 and 14 may also include outer layers 16, 16' comprised of 100% EVA, inner sealant layers 18 and 18' of 100% LLDPE and a tie layer 20 of 85% EVA and 15% PB.

In each of the examples described, the composition of the tie layer 20 is more similar to the composition of the first outer layer 16 than it is to the first inner sealant layer 18, therefore the bond strength between the first outer layer 16 and the tie layer 20 is greater than the bond strength between the tie layer 20 and the first inner sealant layer 18. The bond between the second inner sealant layer 18' and the second outer layer 16' is also greater than the bond between the tie layer 20 and the first inner sealant layer 18. The heat seal between the first and second inner sealant layers 18, 18' is at least as great as the bond between any of the other two respective adjacent layers of the first and second package walls 12 and 14. Therefore, as indicated in FIG. 2, peel failure is designed to occur between the first inner sealant layer 18 and the tie layer 20 where the bond strength is the weakest. It has been found that generally a force of between 600 and 1200 grams per inch width is required to achieve peel failure.

FIG. 3 illustrates an arrangement wherein the peel failure is designed to occur between the first outer layer 16 and the tie layer 20. The outer layers 16 and 16' in that arrangement are composed of either 100% EVA or 50% EVA and 50% LLDPE. The inner sealant layers 18 and 18' are comprised of 100% neutralized ethylene acid copolymer and the tie layer 20 is composed of 85% neutralized ethylene acid copolymer and 15% PB. The bond strength between the first inner sealant layer 18 and the tie layer 20 is greater than the bond strength between the tie layer 20 and the first outer layer 16 and hence peel failure occurs between the first outer layer 16 and tie layer 20.

While the embodiments described above define layers composed of specific percentages of each material, it is understood that these percentages are not absolute and may vary within a predetermined range. For example, while the tie layer 20 is described in one embodiment as being composed of 12% polybutylene and in another embodiment as being composed of 15% polybutylene, the actual percentage of polybutylene in the tie layer 20 may range from between 5% and 30% and still be effective in determining the point of peel failure. The higher the content of polybutylene in the tie layer 20, the lower the peel failure value, that is, the stronger the bond strength of the tie layer 20. The bond strength is modified by the percentage of polybutylene therein.

Figure 4:
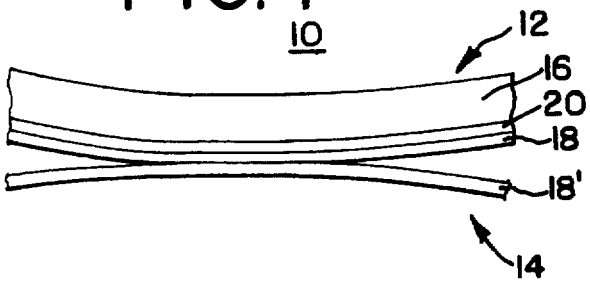
FIG. 4 shows a side view of an alternate embodiment of the seal portion of the package of the present invention.
Figure 5:
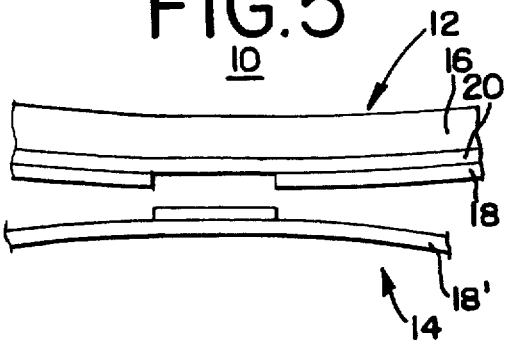
FIG. 5 shows one predetermined mode of peel failure of the seal shown in FIG. 4.

An alternate embodiment of an easy open package is illustrated in FIGS. 4 and 5. The embodiment is identical to the preferred embodiment described above and illustrated in FIGS. 1 and 2, except that there is no second outer layer 16' in the second package wall 14. Only the second inner sealant layer 18' is provided. As described above, peel failure may occur between the first inner sealant layer 18 and the tie layer 20, as indicated in FIG. 5, or it may occur between the tie layer 20 and the first outer layer 16, depending on the composition of the layers of the first package wall 12.

Figure 6:
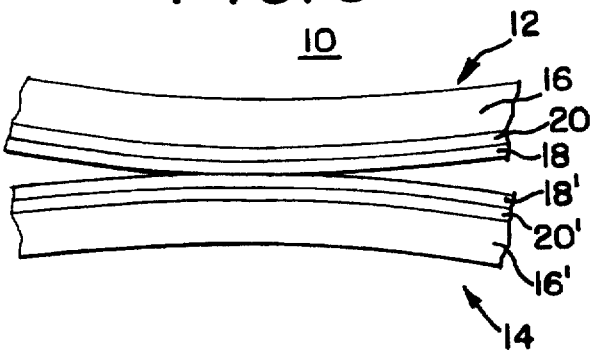
FIG. 6 shows a side view of another alternate embodiment of the seal portion of the package of the present invention.
Figure 7:
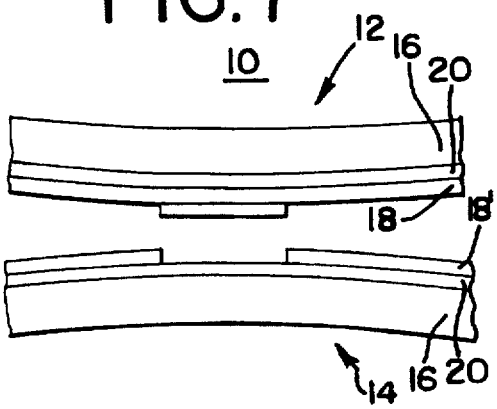
FIG. 7 shows one predetermined mode of peel failure of the seal shown in FIG. 6.

Yet another embodiment is illustrated in FIGS. 6 and 7. This embodiment is identical to the preferred embodiment in all respects except that a second tie layer 20' is disposed between the second inner sealant layer 18' and the second outer layer 16' and is peelably to one and permanently bonded to the other in the same manner as previously described for the first package wall 12. This embodiment is generally indicative of a single web package wherein the first package wall 12 is folded over to form the second package wall 14. In such an arrangement, since the package walls 12 and 14 are identical, it is apparent that, depending on the composition of the layers, peel may occur either between the first outer layer 16 and the first tie layer 20 or between the first tie layer 20 and the first inner sealant layer 18, or in the alternative, either between the second outer layer 16' and the second tie layer 20' or between the second tie layer 20' and the second inner sealant layer 18', as shown in FIG. 7. In such an arrangement, it can not be predetermined in which package wall 12 or 14 the peel failure will occur and for this reason, this embodiment is least preferred to the other two. It is understood, however, that a two web package may also be provided having a first package wall comprising a first outer layer, a first inner sealant layer, and a first tie layer disposed therebetween, and a second package wall comprised of a second outer layer, a second inner sealant layer and a second tie layer is composed of material different from the first tie layer. This would permit predetermination of the package wall in which peel failure would occur.

Thus, it has been shown that the preset invention provides an easy open package wherein the point of peel failure may be predetermined by careful selection of each of the adjacent layers of the package walls.

Various embodiments of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. An easy open package adapted to be heat sealed to a closed condition to contain and protect product disposed therein, but which is readily openable by application of force, said package including a first package wall having a first thermoplastic polymeric film construction *of a three layer coextrusion* comprising a first outer layer, a first inner sealant layer of polymer and a first tie layer disposed between said first outer layer and said first inner sealant layer, said tie layer comprising a combination of polybutylene and one other constituent and being peelably bonded to [one of either] *only one of* said first outer layer [or] *and* said first inner sealant layer and *said tie layer further* being permanently bonded to the other layer to which said tie layer is not peelably bonded, a second package wall joined at a portion of its perimeter to said first package wall, said second package wall having a second thermoplastic polymeric film construction with a second inner sealant layer of the same polymer as, and disposed adjacent to, said first inner sealant layer of said first film construction, *a second outer layer, and a second tie layer disposed between said second outer layer and said second inner sealant layer, said second tie layer being peelably bonded to one of either said second outer layer or said second inner sealant layer and permanently bonded to the other of said second outer layer or said second inner sealant layer,* whereby when said first inner sealant layer of said first film construction is heat sealed to said adjacent second inner sealant layer of said second film construction along a heat seal, a bond is formed between said inner sealant layers having greater bond strength than the peelable bond between said tie layer and said one layer of said first film construction to which said tie layer is peelably bonded such that upon application of force to open said package, the first and second inner sealant layers will remain bonded together and opening will take place between the peelably bonded layers at said heat seal.

2. The easy open package of claim 1 wherein said first outer layer of said first package wall is selected from the group consisting of ethylene vinyl acetate copolymer, linear low density polyethylene, ethylene ethyl acrylate copolymer, ethylene methyl acrylate copolymer, neutralized ethylene acid copolymer, [or] *and* low density polyethylene.

3. The easy open package of claim 1 wherein said first inner sealant layer of said first package wall is selected from the group consisting of ethylene acid copolymer, linear low density polyethylene, low density polyethylene [or] *and* ethylene vinyl acetate copolymer.

4. The easy open package of claim 1 wherein said one other constituent of said tie layer is selected from the group consisting of ethylene vinyl acetate copolymer, ethylene acid copolymer and linear low density polyethylene.

5. The easy open package of claim 1 wherein said first tie layer is permanently bonded to said first outer layer and peelably bonded to said first inner sealant layer, said first tie layer consisting of said other constituent and between 5 and 30% polybutylene and wherein said first outer layer consists entirely of said other constituent.

6. The easy open package of claim 1 wherein said first tie layer is permanently bonded to said first outer layer and peelably bonded to said first inner sealant layer, said first tie layer consisting of said other constituent and between 5 and 30% polybutylene and wherein said first outer layer consists of at least 50% of said other constituent and *a* correlative percentage of [a third] *another* constituent.

7. The easy open package of claim 1 wherein said first tie layer is permanently bonded to said first inner sealant layer and peelably bonded to said first outer layer, said first tie layer consisting of said other constituent and between 5 and 30% polybutylene and wherein said first inner sealant layer consists entirely of said other constituent.

8. The easy open package of claim 1 wherein said first tie layer is permanently bonded to said first inner sealant layer and peelably bonded to said first outer layer, said first tie layer consisting of said other constituent and between 5 and 30% polybutylene and wherein said first inner sealant layer consists of at least 50% of said other constituent and a correlative percentage of [a third] *another* constituent.

9. The easy open package of claim 1 wherein said first outer layer is comprised of 50% ethylene vinyl aceetate copolymer and 50% linear low density polyethylene, said first inner sealant layer is comprised of substantially 100% neutralized ethylene acid copolymer and said first tie layer is comprised of 88% ethylene vinyl acetate copolymer and 12% polybutylene.

10. The easy open package of claim 1 wherein said first outer layer is comprised of substantially 100% ethylene vinyl acetate copolymer, said first inner sealant layer is comprised of substantially 100% neutralized ethylene acid copolymer and said first tie layer is comprised of 85% neutralized ethylene acid copolymer and 15% polybutylene.

11. The easy open package of claim 1 wherein said first outer layer is comprised of 50% ethylene vinyl acetate copolymer and 50% linear low density polyethylene, said first inner sealant layer is comprised of substantially 100% neutralized ethylene acid copolymer and said first tie layer is comprised of 85% neutralized ethylene acid copolymer and 15% polybutylene.

12. The easy open package of claim 1 wherein said first outer layer is comprised of substantially 100% linear low density of polyethylene, said first inner sealant layer is comprised of substantially 100% neutralized ethylene acid copolymer and said first tie layer is comprised of 88% linear low density polyethylene and 12% polybutylene.

13. The easy open package of claim 1 wherein said first outer layer is comprised of substantially 100% ethylene vinyl acetate copolymer, said first inner sealant layer is comprised of substantially 100% linear low density polyethylene and said first tie layer is comprised of 85% ethylene vinyl acetate copolymer and 15% polybutylene.

[14. The easy open package of claim 1 wherein said second package wall includes a second outer layer adjacent to and disposed exteriorly of said second inner sealant layer.]

[15. The easy open package of claim 14 wherein said second package wall includes a second tie layer disposed between said second outer layer and said second inner sealant layer.]

[16. The easy open package of claim 15 wherein said second tie layer is peelably bonded to one of either said second outer layer or said second inner sealant layer and permanently bonded to the other of said second outer layer or said second inner sealant layer.]

[17. The easy open package of claim 15 wherein said second tie layer is permanently bonded both to said second outer layer and to said second inner sealant layer.]

*18. An easy open package adapted to be heat sealed to a closed condition to contain and protect product disposed therein, but which is readily openable by application of force, said package including a first package wall having a first thermoplastic polymeric film construction of a three layer coextrusion comprising a first outer layer, a first inner sealant layer of polymer and a first tie layer disposed between said first outer layer and said first inner sealant layer, said tie layer comprising a combination of polybutylene and one another constituent and being peelably bonded to only one of said first outer layer and said first inner layer and said tie layer further being permanently bonded to the other layer to which said tie layer is not peelably bonded, a second package wall joined at a portion of its perimeter to said first package wall, said second package wall having a second thermoplastic polymeric film construction with a second inner sealant layer of the same polymer as, and disposed adjacent to, said first inner sealant layer of said first film construction, a second outer layer, and a second tie layer disposed between said second outer layer and said second inner sealant layer, said second tie layer being permanently bonded both to said second outer layer and to said second inner sealant layer, whereby when said first inner sealant layer of said first film construction is heat*

*sealed to said adjacent second inner sealant layer of said second film construction along a heat seal, a bond is formed between said inner sealant layers having greater bond strength than the peelable bond between said tie layer and said one layer of said first film construction to which said tie layer is peelably bonded such that upon application of force to open said package, the first and second inner sealant layers will remain bonded together and opening will take place between the peelably bonded layers at said heat seal.*

* * * * *

Disclaimer

Re.37,171—David A. Busche, Neenah; David H. Bostian, Sheboygan, both of WI. EASY OPEN PACKAGE. Patent dated May 8, 2001. Disclaimer filed by the assignee November 10, 2004, Curwood, Inc.

Hereby disclaims complete claims 1-13.

*(Official Gazette, July 26, 2005)*